United States Patent
Wu et al.

(10) Patent No.: US 8,668,346 B2
(45) Date of Patent: Mar. 11, 2014

(54) SIMULATED SUNLIGHT GENERATING DEVICE

(75) Inventors: Chih-Hung Wu, Longtan Township (TW); Min-De Yang, Longtan Township (TW); Chan-Wei Yeh, Longtan Township (TW)

(73) Assignee: Institute of Nuclear Energy Research, Atomic Energy Council, Executive Yuan, Longtan Township, Taoyuan County (TW)

( * ) Notice: Subject to any disclaimer, the term of this patent is extended or adjusted under 35 U.S.C. 154(b) by 113 days.

(21) Appl. No.: 13/306,443

(22) Filed: Nov. 29, 2011

(65) Prior Publication Data
US 2012/0287597 A1 Nov. 15, 2012

(30) Foreign Application Priority Data

May 10, 2011 (TW) .............................. 100116316 A

(51) Int. Cl.
*F21V 9/02* (2006.01)
(52) U.S. Cl.
USPC .................................. 362/2; 362/1; 362/231

(58) Field of Classification Search
USPC .................................................. 362/1, 2, 231
See application file for complete search history.

(56) References Cited

U.S. PATENT DOCUMENTS

| | | | |
|---|---|---|---|
| 5,961,201 A * | 10/1999 | Gismondi | 362/233 |
| 2007/0030662 A1* | 2/2007 | Hsu | 362/1 |
| 2008/0223441 A1* | 9/2008 | Jungwirth | 136/259 |
| 2010/0287830 A1* | 11/2010 | Chen et al. | 47/58.1 LS |

\* cited by examiner

*Primary Examiner* — Stephen F Husar
*Assistant Examiner* — Meghan Dunwiddie
(74) *Attorney, Agent, or Firm* — Hoffmann & Baron, LLP

(57) ABSTRACT

A simulated sunlight generating device for generating a simulated sunlight required for evaluating performance of solar cells includes a plurality of driving units, a plurality of light-emitting units, and a plurality of adjusting units. The driving units drive the light-emitting units to emit light. The adjusting units enable the light of the light-emitting units to not only propagate along the same light route but also be added up and combined to form the simulated sunlight of an intended wavelength with ease of installation, ease of maintenance, low costs, high flexibility, and high efficiency.

13 Claims, 3 Drawing Sheets

SIMULATED SUNLIGHT GENERATING DEVICE

CROSS-REFERENCE TO RELATED APPLICATION

This non-provisional application claims priority under 35 U.S.C. §119(a) on Patent Application No(s). 100116316 filed in Taiwan, R.O.C. on May 10, 2011, the entire contents of which are hereby incorporated by reference.

FIELD OF THE INVENTION

The present invention relates to simulated sunlight generating devices, and more particularly, to a simulated sunlight generating device for generating a simulated sunlight by adding up and combining light rays emitted from a plurality of light-emitting units.

BACKGROUND OF THE INVENTION

To conduct indoors a test on a solar cell composed of a plurality of cells according to the prior art, it is necessary to simulate sunlight required for the evaluation of the performance of the solar cell in utilizing sunlight.

Referring to FIG. 1, there is shown a schematic view of a conventional simulated sunlight generating device. The simulated sunlight-based test involves driving a light-emitting diode array 2 to emit a high-brightness light L for functioning as the simulated sunlight. The light-emitting diode array 2 comprises a plurality of light-emitting diodes 22. The light-emitting diodes 22 each emit the light L. The light L emitted from each of the light-emitting diodes 22 travels a distance d before reaching cells 42 of a solar cell 4 to undergo a test. The distance d, however, opens up a possibility that the light L from any one of the light-emitting diodes 22 misses one of the cells 42, or, in other words, the possibility that one of cells 42 does not necessary receive the full illumination intensity of the light L from the light-emitting diodes 22, for reasons below. The light-emitting diodes 22 each emit the light L by a scattering angle θ. If each of the cells 42 is to receive the light L from all the light-emitting diodes 22, each of the cells 42 will have to be present within the range of angle covering all the scattering angles θ. In practice, it is impossible for any one of the cells 42 to fall within the range of angle covering all the scattering angles θ of the light-emitting diodes 22. The above drawbacks of the prior art cannot be overcome by reducing the distance d between the light-emitting diodes 22 and the solar cell 4 or positioning the light-emitting diodes 22 immediately above the cells 42, respectively.

Accordingly, it is imperative to provide a simulated sunlight specific to one and only one cell or even specific to a solar cell in its entirety. To this end, the present invention provides a simulated sunlight generating device that is easy to install and maintain, incurs low costs, and is highly flexible and efficient.

SUMMARY OF THE INVENTION

It is an objective of the present invention to provide a simulated sunlight generating device for generating a simulated sunlight by adding up and combining light rays emitted from a plurality of light-emitting units.

Another objective of the present invention is to provide a simulated sunlight generating device for generating a simulated sunlight required for the evaluation of the performance of a solar cell in utilizing sunlight.

In order to achieve the above and other objectives, the present invention provides a simulated sunlight generating device for generating a simulated sunlight, comprising: a plurality of driving units for generating a plurality of driving currents; a plurality of light-emitting units connected to the driving units for emitting light of corresponding wavelength and illumination intensity based on the driving currents, respectively; and a plurality of adjusting units disposed at a light-emitting route of the light-emitting units for changing light-emitting directions of the light-emitting units, respectively, and enabling the light of the light-emitting units to not only propagate along a same light route but also be added up and combined to form the simulated sunlight.

Unlike the prior art, the present invention provides a simulated sunlight generating device for generating simulated sunlight of the same wavelength and illumination intensity per unit area to optimize simulation of sunlight. In addition to optimization, the simulation of sunlight, as effected by the simulated sunlight generating device of the present invention, features variability and flexibility, because the light-emitting units are separately driven and thereby can be different from each other in terms of the wavelength of the light rays emitted, such that the emitted light rays of different wavelengths can be added up or combined to generate the simulated sunlight of one, some, or all of the wavelengths. Furthermore, the simulated sunlight is generated in a light-emitting direction after light rays emitted from the light-emitting units have been added up or combined by the adjusting units; hence, the simulation of sunlight demonstrates high efficiency and high directivity. By contrast, as disclosed in the prior art, conventional light-emitting units generate the simulated sunlight in a light-emitting direction directly, and thus the simulation of sunlight is inefficient due to variation in the characteristics of the light-emitting units. Accordingly, the present invention provides a simulated sunlight generating device that is easy to install and maintain, incurs low costs, and is highly flexible and efficient.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
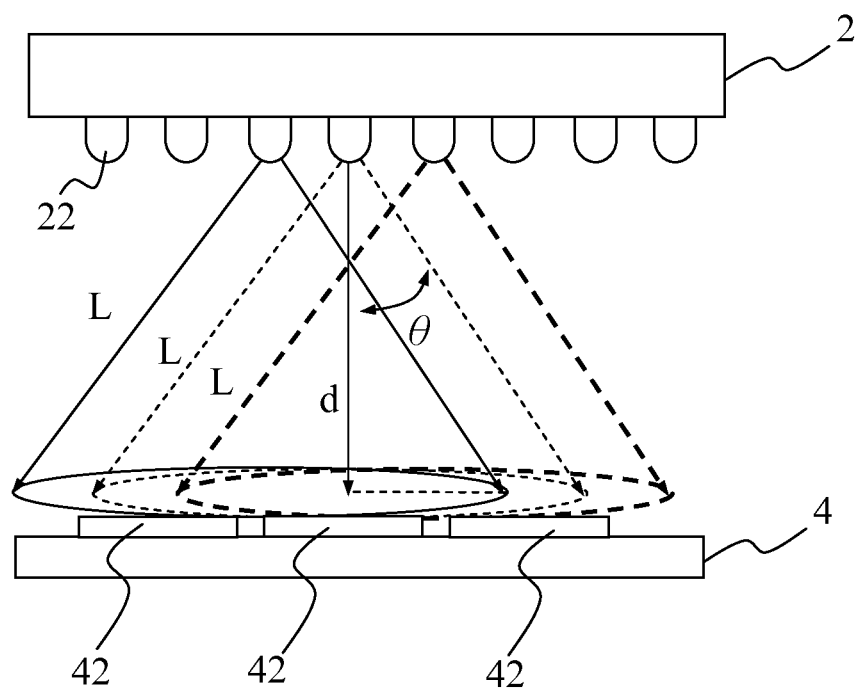
FIG. 1 (PRIOR ART) is a schematic view of a conventional simulated sunlight generating device.
Figure 2:
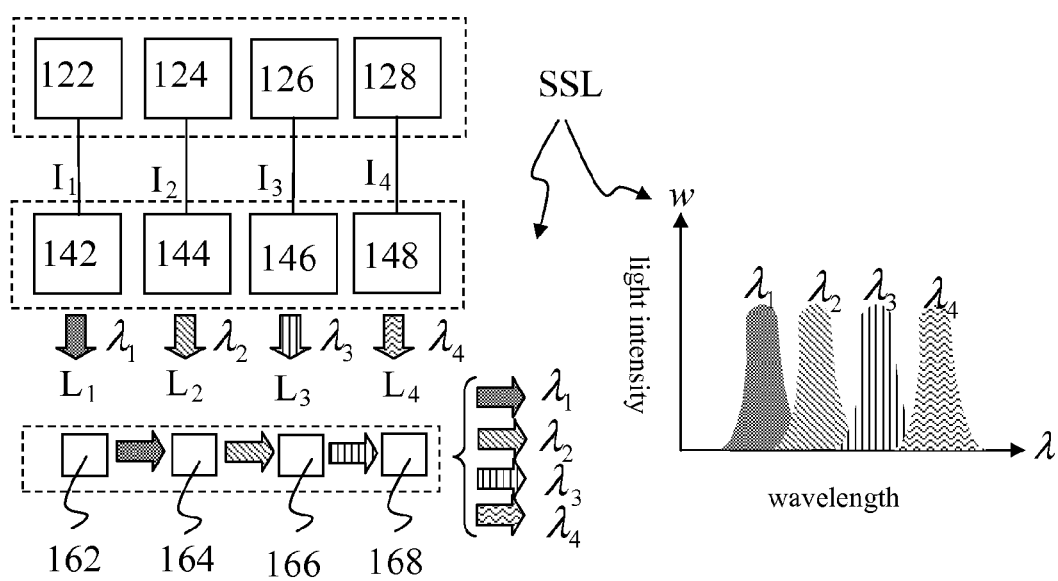
FIG. 2 contains a schematic view of the architecture of a simulated sunlight generating device and a graph of light intensity versus wavelength according to an embodiment of the present invention.

Referring to FIG. 2, there are shown a schematic view of the architecture of a simulated sunlight generating device and a graph of light intensity versus wavelength according to an embodiment of the present invention. As shown in FIG. 2, designed to generate a simulated sunlight SSL, a simulated sunlight generating device 10 comprises a plurality of driving units 122-128, a plurality of light-emitting units 142-148, and a plurality of adjusting units 162-168. This embodiment is exemplified by four said driving units, four said light-emitting units, and four said adjusting units.

The driving units 122-128 generate a plurality of driving currents $I_1$-$I_4$. The illumination intensity and wavelength of light emitted from the light-emitting units 142-148 being driven depend on the strength of the driving currents $I_1$-$I_4$. With the light-emitting units 142-148 being driven by the driving units 122-128 separately, the strength of the driving currents $I_1$-$I_4$ is adjusted to equalize the illumination intensity of the light emitted. It is because the service life or modulation of the light-emitting units 142-148 depends on their driving characteristics and constituent materials.

The light-emitting units 142-148 are connected to the driving units 122-128, respectively. The light-emitting units 142-148 emit light $L_1$-$L_4$ of wavelength $\lambda_1$-$\lambda_4$ according to the driving currents $I_1$-$I_4$. For example, the light-emitting units 142-148 are light-emitting diodes, organic light-emitting diodes, or a combination thereof. In an embodiment, the light-emitting units emit light of wavelengths corresponding to that of the three primary colors (RGB). For example, in an embodiment, the simulated sunlight generating device 10 comprises driving units, light-emitting units, and adjusting units, wherein the RGB wavelengths of the simulated sunlight generated by the simulated sunlight generating device 10 are namely the red light wavelength 600 nm~700 nm, the green light wavelength 500~600 nm, and the blue light wavelength 400 nm~500 nm. Hence, given the RGB wavelengths of the simulated sunlight thus generated, the simulated sunlight SSL thus generated is white visible light. After the light $L_1$-$L_4$ generated by the light-emitting units 142-148 have been added up, the wavelength of the simulated sunlight SSL includes the wavelength of visible light and the wavelength of invisible light, wherein the wavelength of the simulated sunlight SSL ranges between 240 nm and 2400 nm.

The adjusting units 162-168 are disposed at a light-emitting route of the light-emitting units 142-148. The adjusting units 162-168 change the light-emitting directions of the light-emitting units 142-148, respectively. The adjusting units 162-168 enable the light $L_1$-$L_4$ of the light-emitting units 142-148 to not only propagate along the same light route but also be added up and combined to form the simulated sunlight SSL. For example, the adjusting units 162-168 veer the light $L_1$-$L_4$ to a vertical direction simultaneously and confine the light $L_1$-$L_4$ to the light route. Furthermore, the adjusting units 162-168 are beam splitters and/or reflectors. For example, in this embodiment, the reflectors change the light-emitting directions of the light $L_1$-$L_4$ from the light-emitting units 142-148, such that the light-emitting directions end up in the light route due to reflection.

Figure 3:
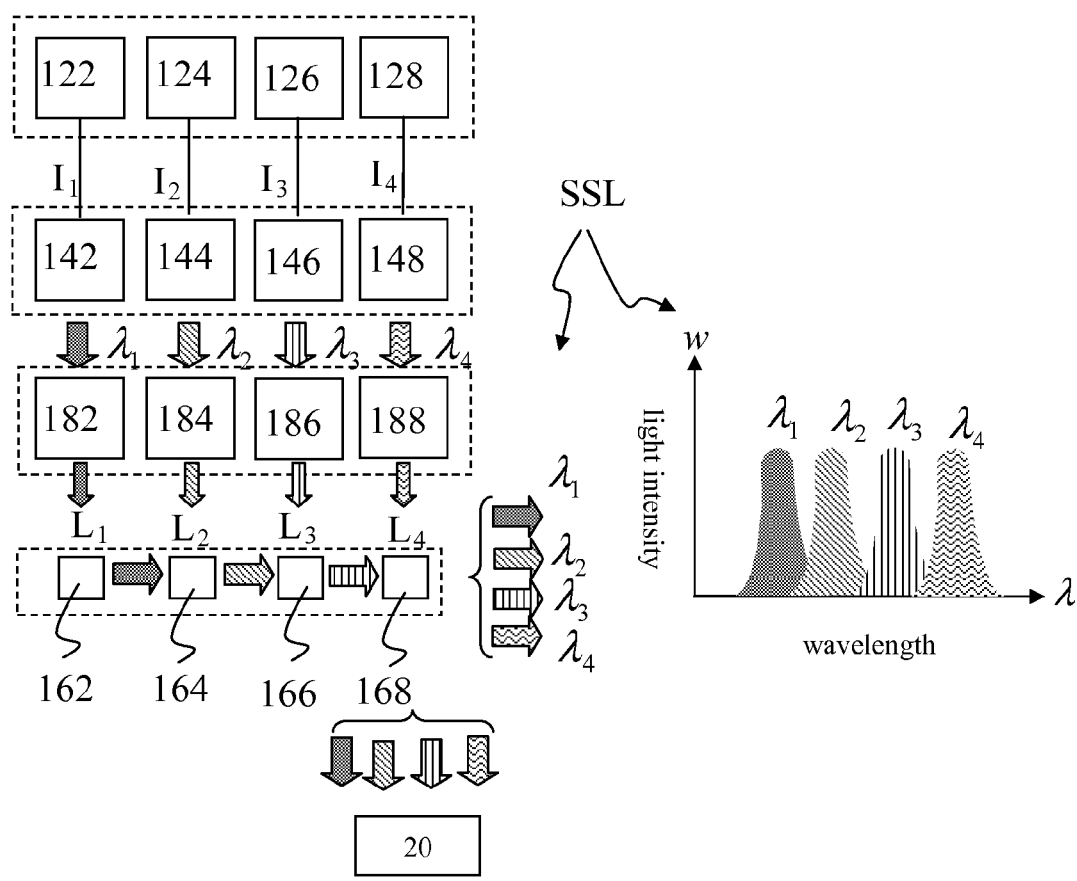
FIG. 3 contains a schematic view of the architecture of another simulated sunlight generating device and a graph of light intensity versus wavelength according to another embodiment of the present invention.

Referring to FIG. 3, there are shown a schematic view of the architecture of another simulated sunlight generating device and a graph of light intensity versus wavelength according to another embodiment of the present invention. As shown in FIG. 3, a simulated sunlight generating device 10' generates the simulated sunlight SSL. In addition to the plurality of driving units 122-128, the plurality of light-emitting units 142-148, and the plurality of adjusting units 162-168 mentioned in the previous embodiment, the simulated sunlight generating device 10' further comprises a plurality of condensation units 182-188 and/or a detection unit 20. The condensation units 182-188 are disposed between the light-emitting units 142-148 and the adjusting units 162-168 for condensing the light $L_1$-$L_4$ such that the light $L_1$-$L_4$ thus condensed are focused on one of the adjusting units 162-168. For example, the condensation units 182-188 are implemented in the form of a single lens or a lens assembly. A point to note is that, for a manufacturing-related reason, the light $L_1$-$L_4$ may manifest directivity badly or have a large scattering angle, thereby compromising the condensation of the light $L_1$-$L_4$. Hence, the efficiency of the generation of the simulated sunlight SSL is enhanced, when the condensation units 182-188 condense and focus the light $L_1$-$L_4$ on the adjusting units 162-168. In another embodiment, the condensation units 182-188 are directly disposed on the light-emitting units 142-148 to achieve the aforesaid function and effect.

The adjusting units 162-168 are beam splitters and/or reflectors. The beam splitters facilitate the detection of at least one of the light $L_1$-$L_4$ or illumination intensity of the simulated sunlight SSL by the detection unit 20, such that the status of the light $L_1$-$L_4$ can be dynamically analyzed. This embodiment is exemplified by the detection of the illumination intensity of the simulated sunlight SSL.

Unlike the prior art, the present invention provides a simulated sunlight generating device for generating simulated sunlight of the same wavelength and illumination intensity per unit area to optimize simulation of sunlight. In addition to optimization, the simulation of sunlight, as effected by the simulated sunlight generating device of the present invention, features variability and flexibility, because the light-emitting units are separately driven and thereby can be different from each other in terms of the wavelength of the light rays emitted, such that the emitted light rays of different wavelengths can be added up or combined to generate the simulated sunlight of one, some, or all of the wavelengths. Furthermore, the simulated sunlight is generated in a light-emitting direction after light rays emitted from the light-emitting units have been added up or combined by the adjusting units; hence, the simulation of sunlight demonstrates high efficiency and high directivity. By contrast, as disclosed in the prior art, conventional light-emitting units generate the simulated sunlight in a light-emitting direction directly, and thus the simulation of sunlight is inefficient due to variation in the characteristics of the light-emitting units. Accordingly, the present invention provides a simulated sunlight generating device that is easy to install and maintain, incurs low costs, and is highly flexible and efficient.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A simulated sunlight generating device for generating a simulated sunlight, comprising:
    a plurality of driving units for generating a plurality of driving currents;
    a plurality of light-emitting units connected to the driving units for emitting light of corresponding wavelength and illumination intensity based on a strength of the plurality of driving currents, the strength of the plurality of driving currents being adjustable to equalize the illumination intensity of the emitting light; and
    a plurality of adjusting units disposed at a light-emitting route of the light-emitting units, changing light-emitting directions of the light-emitting units, and enabling light rays emitted from the light-emitting units to propagate along a same light route, the light rays being simultaneously added up, combined and dynamically analyzed by the plurality of adjusting units to form the simulated sunlight, the simulated sunlight propagating in the light-emitting directions with high efficiency and high directivity.

2. The simulated sunlight generating device of claim 1, wherein the light-emitting units are light-emitting diodes, organic light-emitting diodes, or a combination thereof.

3. The simulated sunlight generating device of claim 2, wherein the light-emitting units emit light of wavelengths corresponding to that of three primary colors.

4. The simulated sunlight generating device of claim 3, wherein the light-emitting units emit light of wavelengths corresponding to that of red, green, and blue light of the three primary colors.

5. The simulated sunlight generating device of claim 4, wherein the red light wavelength is 600 nm~700 nm, the green light wavelength is 500~600 nm, and the blue light wavelength is 400 nm~500 nm.

6. The simulated sunlight generating device of claim 2, wherein, after the light generated by the light-emitting units have been added up, the wavelength of the simulated sunlight includes the wavelength of visible light and the wavelength of invisible light.

7. The simulated sunlight generating device of claim 6, wherein the simulated sunlight is of a wavelength ranging between 240 nm and 2400 nm.

8. The simulated sunlight generating device of claim 1, further comprising a plurality of condensation units disposed between the light-emitting units and the adjusting units for condensing the light and focusing the light thus condensed on one of the adjusting units.

9. The simulated sunlight generating device of claim 8, wherein the condensation units are a single lens or a lens assembly.

10. The simulated sunlight generating device of claim 8, wherein the condensation units are directly disposed on the light-emitting units.

11. The simulated sunlight generating device of claim 1, wherein the adjusting units are at least one of a beam splitter and a reflector.

12. The simulated sunlight generating device of claim 1, further comprising a detection unit disposed beside the adjusting units for receiving and detecting the light corresponding thereto.

13. The simulated sunlight generating device of claim 1, wherein the simulated sunlight emits simulated sun rays having a same wavelength and intensity per unit area, thereby optimizing the simulated sunlight that was generated.

* * * * *